US010659371B1

(12) United States Patent
Jain et al.

(10) Patent No.: US 10,659,371 B1
(45) Date of Patent: May 19, 2020

(54) MANAGING THROTTLING LIMITS IN A DISTRIBUTED SYSTEM

(71) Applicant: Amazon Technologies, Inc., Seattle, WA (US)

(72) Inventors: Rachit Jain, Bothell, WA (US); Andrew Oppenlander, Bellevue, WA (US); Yijia Lu, Berkeley, CA (US)

(73) Assignee: Amazon Technologies, Inc., Seattle, WA (US)

( * ) Notice: Subject to any disclaimer, the term of this patent is extended or adjusted under 35 U.S.C. 154(b) by 135 days.

(21) Appl. No.: 15/838,290

(22) Filed: Dec. 11, 2017

(51) Int. Cl.
*G06F 15/173* (2006.01)
*H04L 12/851* (2013.01)
*H04L 29/08* (2006.01)

(52) U.S. Cl.
CPC ........ *H04L 47/2425* (2013.01); *H04L 67/101* (2013.01); *H04L 67/16* (2013.01); *H04L 67/1008* (2013.01); *H04L 67/322* (2013.01)

(58) Field of Classification Search
CPC ... H04L 47/2425; H04L 67/16; H04L 67/101; H04L 67/322; H04L 67/1008
See application file for complete search history.

(56) References Cited

U.S. PATENT DOCUMENTS

| 7,519,725 | B2 | 4/2009 | Alvarez et al. |
| 2007/0118653 | A1 | 5/2007 | Bindal |
| 2009/0164632 | A1* | 6/2009 | Kumar ................ H04L 67/2819 709/225 |
| 2009/0219940 | A1 | 9/2009 | Jansson |
| 2010/0322071 | A1* | 12/2010 | Avdanin .............. H04L 43/0894 370/230 |
| 2012/0060062 | A1 | 3/2012 | Lin et al. |
| 2012/0180021 | A1 | 7/2012 | Byrd et al. |
| 2017/0180414 | A1* | 6/2017 | Andrews ............. H04L 63/1458 |

* cited by examiner

*Primary Examiner* — John B Walsh
(74) *Attorney, Agent, or Firm* — Robert C. Kowert; Kowert, Hood, Munyon, Rankin & Goetzel, P.C.

(57) ABSTRACT

Systems and methods for manage throttling limits in a distributed system are disclosed herein, according to some embodiments. A system includes a plurality of server nodes to perform a service. The system includes one or more processors a memory. The memory stores instructions that, when executed by the one or more processors, cause the one or more processors to perform operations. The operations include receiving a request for the service. The operations also include calculating whether accepting the request would exceed a service throttling limit for the plurality of server nodes for the service and whether accepting the request would exceed a node throttling limit for a server node of the plurality of server nodes. The operations also include accepting the request for processing at the server node responsive to calculating that the service throttling limit and the node throttling limit would not be exceeded.

20 Claims, 7 Drawing Sheets

MANAGING THROTTLING LIMITS IN A DISTRIBUTED SYSTEM

BACKGROUND

Services in a service-oriented provider network can utilize distributed computing nodes to perform various functions required for the services. The provider network may include a load balancer to distribute service requests or service workloads. The load balancer may distribute the service requests to one or many of the distributed computing nodes in order to spread out the service requirements or demands on the computing nodes. A given computing node can have limits as to how many requests can be received and processed in a given period of time. When the given computing node reaches a maximum limit, future requests can be throttled and slowed down at the given computing node. The limit can cause additional service requests to return an error indicating that throttling has occurred. The additional service requests will be dropped by the given computing node.

Figure 1:
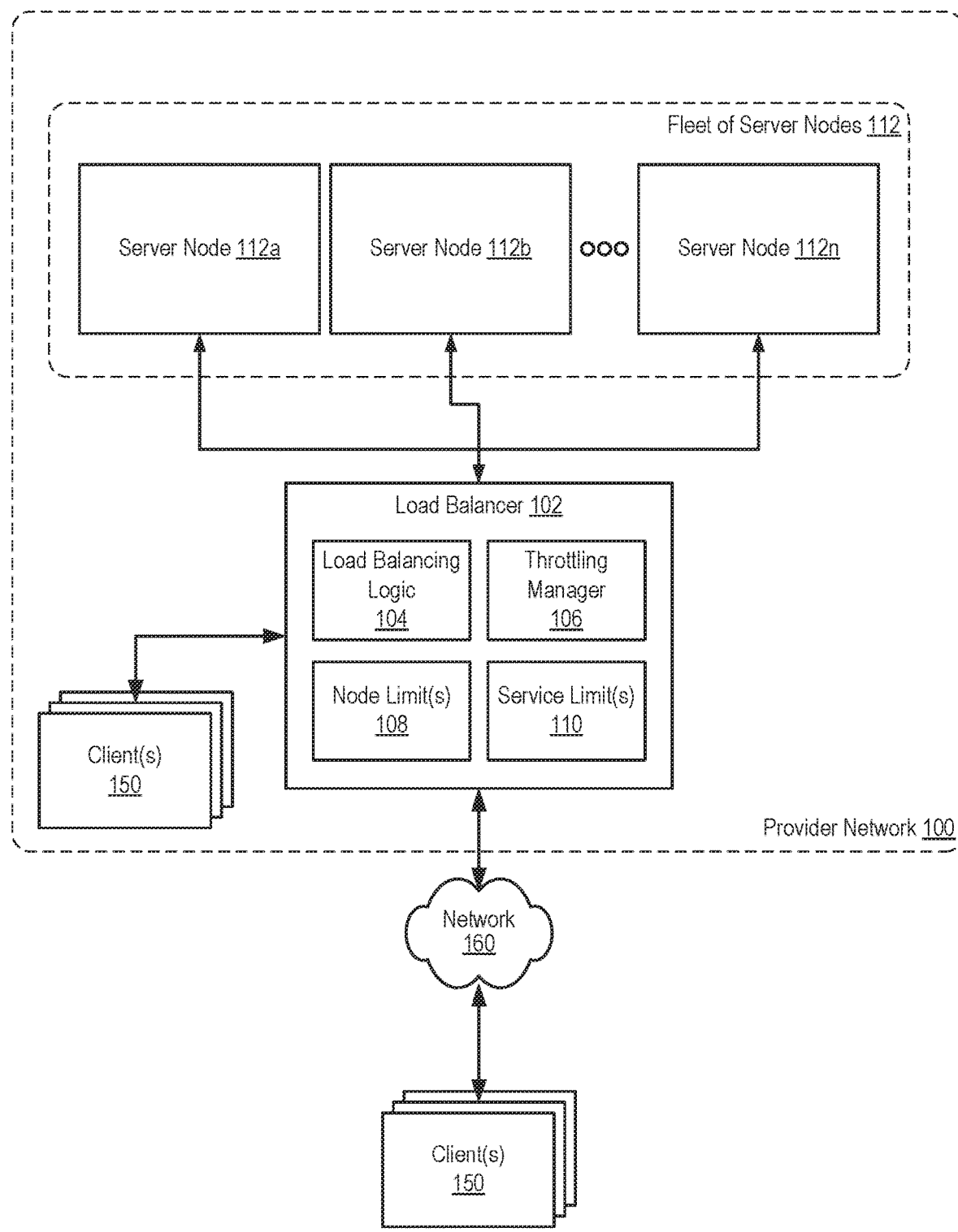
FIG. 1 is a logical block diagram illustrating a provider network that implements a distributed system that incorporates throttling limits, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof. As used throughout this application, the phrase "based on" a factor means based at least in part on the factor, rather than exclusively based on the factor, such that an event "based on" the factor can also be influenced or modified by another factor.

DETAILED DESCRIPTION

Various embodiments of systems and processes that manage throttling limits in a distributed system are disclosed herein. A system is disclosed herein, according to some embodiments. The system includes a plurality of server nodes to perform a service. The system includes one or more processors a memory. The memory stores instructions that, when executed by the one or more processors, cause the one or more processors to perform operations. The operations include receiving a request for the service. The operations also include calculating whether accepting the request would exceed a service throttling limit for the plurality of server nodes for the service and whether accepting the request would exceed a node throttling limit for a server node of the plurality of server nodes. The operations also include accepting the request for processing at the server node responsive to calculating that the service throttling limit and the node throttling limit would not be exceeded.

A method is disclosed herein, according to some embodiments. The method includes receiving a request for a service. The method also includes calculating whether accepting the request would exceed a service throttling limit for a plurality of server nodes for the service and whether accepting the request would exceed a node throttling limit for a server node of the plurality of server nodes. The method further includes accepting the request for processing at the server node responsive to calculating that the service throttling limit and the node throttling limit would not be exceeded.

A non-transitory, computer-readable storage medium is disclosed herein, according to some embodiments. The non-transitory, computer-readable storage medium stores instructions that, when executed by one or more processors, cause the one or more processors to receive a request for a service. The instructions further cause the one or more processors to calculate whether accepting the request would exceed a service throttling limit for a plurality of server nodes for the service and whether accepting the request would exceed a node throttling limit for a server node of the plurality of server nodes. The instructions also cause the one or more processors to accept the request for processing at the server node responsive to calculating that the service throttling limit and the node throttling limit would not be exceeded.

A method for distributing service requests with respect to service throttling limits and node throttling limits is disclosed, according to some embodiments. The method includes receiving a request for a service. The method also includes determining whether accepting the request would exceed a service throttling limit for a fleet of server nodes. The method further includes determining whether accepting the request would exceed a node throttling limit for a server node of the fleet of server nodes Based on a determination that accepting the request would not exceed the service throttling limit and the node throttling limit for the server node, the method continues by accepting the request for processing at the server node. Based on a determination that accepting the request would exceed the service throttling limit or the node throttling limit for the server node, the method includes rejecting the request and performing one or more actions based on which of the service throttling limit or the node throttling would be exceeded.

A method for distributing service requests from a load balancer with respect to service throttling limits and node throttling limits is disclosed, according to some embodiments. The method includes receiving, at the load balancer, a request for a service. The method includes tracking respective quantities of requests processed at server nodes of a fleet of server nodes. The method also includes determining whether accepting the request would exceed a service throttling limit for a fleet of server nodes. The method includes determining whether accepting the request would exceed a node throttling limit for the server node. Based on a determination that accepting the request would not exceed the service throttling limit and the node throttling limit for the server node, the method continues by sending the request to the server node for processing at the server node. Based on a determination that accepting the request would exceed the service throttling limit or the node throttling limit for the server node, the method includes rejecting the request and performing one or more actions based on which of the service throttling limit or the node throttling would be exceeded.

A method for managing service requests at a server node with respect to service throttling limits and node throttling limits is disclosed, according to some embodiments. The method includes receiving, at a server node of a fleet of server nodes from a load balancer, a request for a service. The method also includes calculating a service-wide quantity of requests based on respective quantities of requests processed at other server nodes received from the other server nodes. The method also includes determining whether accepting the request would exceed a service throttling limit for a fleet of server nodes. The method includes determining whether accepting the request would exceed a node throttling limit for the server node. Based on a determination that accepting the request would not exceed the service throttling limit and the node throttling limit for the server node, the method continues by processing the request at the server node. Based on a determination that accepting the request would exceed the service throttling limit or the node throttling limit for the server node, the method includes rejecting the request and performing one or more actions based on which of the service throttling limit or the node throttling would be exceeded.

FIG. 1 is a block diagram illustrating a provider network 100 configured to provide one or more services, a load balancer 102 and a plurality of server nodes 112, according to some embodiments. Provider network 100 may be a private or closed system, in one embodiment, or may be set up by an entity such as a company or a public sector organization to provide one or more services (such as various types of cloud-based storage) accessible via the Internet and/or other networks to clients 150, in another embodiment. In one embodiment, provider network 100 may be implemented in a single location or may include numerous data centers hosting various resource pools, such as collections of physical and/or virtualized computer servers, storage devices, networking equipment and the like (e.g., computing system 700 described below with regard to FIG. 7), needed to implement and distribute the infrastructure and storage services offered by the provider network 100. In one embodiment, provider network 100 may implement various computing resources or services using a plurality of server nodes 112, such as a database service or other data processing (e.g., relational or non-relational (NoSQL) database query engines, map reduce processing, data warehouse, data flow processing, and/or other large scale data processing techniques), data storage services (e.g., an object storage service, block-based storage service, or data storage service that may store different types of data for centralized access), virtual compute services, and/or any other type of network based services (which may include various other types of storage, processing, analysis, communication, event handling, visualization, and security services not illustrated).

In some embodiments, provider network 100 may provide one or more services utilizing a plurality of server nodes 112. The services may be performed by the plurality of server nodes 112 in serial or in parallel with respect to other server nodes. In some embodiments, the services may cause continuously issued service requests to the plurality of server nodes 112 and return service responses as they are generated by the plurality of server nodes 112.

In some embodiments, the server nodes 112 are accessible to other portions of the provider network 100 using Transmission Control Protocol (TCP) based connections. For example, the services 102 and/or the load balancer 102 may send the service requests to the server nodes 112 using a TCP connection. The clients 150 send the service requests to the services 102 via a different TCP connection via network 160. In some embodiments, when a node throttling limit is reached for a given node (e.g., a quantity of service requests per second has been met or exceeded), the services 102 or the load balancer 102 may terminate a respective TCP connection to the given node. For example, after determining that the given node is at a maximum capacity for service requests, load balancer 102 may terminate any pending or future TCP connections while the quantity of TCP requests exceeds limit 112 for the given server node 112a. As another example, services 102 may calculate the throttling limit for the given node and make a determination that the throttling limit for the given node has been met by currently active service requests. Thus, services 102 may terminate a respective TCP connection to the given service node. In other embodiments, the given server node 112a may reference metadata stored at the given server node 112a to reference a node throttling limit that indicates the quantity of service requests per second that the given server node 112a is capable of handling.

In some embodiments, provider network 100 may receive one or more service requests to perform one or more services. In some embodiments, the service requests may originate from another service of the services. In other embodiments, the service requests may originate from clients 150. For example, the clients 150 may send service requests for the services to have plurality of server nodes 112 (also referred to, herein, as a fleet of service nodes) perform at least a portion of the services in response to the service requests, as described herein. In some embodiments, load balancer 102 may manage or distribute the service requests to the plurality of server nodes 112. For example, load balancer 102 may include load balancing logic 104 to determine destination server nodes (e.g., server nodes 112a . . . n) for processing service requests. Load balancing logic 104 may cause distribution of the service requests subject to various constraints such as node throttling limits 108 or service throttling limits 110. In some embodiments, load balancer 102 may distribute the service requests to one or more server nodes of the plurality of server nodes 112. For example, load balancer 102 may distribute the service requests evenly to the server nodes in order to evenly distribute the resource requirements needed to fulfill the service requires. In another example, load balancer 102 may distribute all of the service requests to one server node of the plurality of server nodes 112 up until the server node reaches a maximum request limit. In some embodiments, the maximum request limit may correspond to a throttling limit. For example, the throttling limit may correspond to a quantity of service requests in a given period of time that the server node can handle. The throttling limit may be based on a service level agreement (SLA) with clients 150, hardware configuration limits, CPU utilization, recent bandwidth consumption, number of concurrent connections, or any combination thereof. In some embodiments, load balancer 102 may receive header information in the service request that identifies clients 150. For example, the header information may include account information for clients 150 that may be used to look up SLAs or similar information that identifies a given client's throttling limit.

The throttling limit may be managed on a per-node basis, which may be referred to as a node throttling limit. Load balancer 102 may store information indicating respective node throttling limits 108 for each of the server nodes 112 as data or metadata, according to some embodiments. For example, load balancer 102 may maintain a data store configured to store respective metadata corresponding to the server nodes 112. In some embodiments, throttling manager 106 may be configured to calculate the node throttling limits 108 based at least in part on SLAs, hardware configuration limits, CPU utilization, recent bandwidth consumption, number of concurrent connections, or any combination thereof. Server nodes 112a . . . n may also provide health status information or records that may indicate respective health statuses of server nodes 112a . . . n, according to some embodiments. The health status records may include a recent quantity of requests processed by server nodes 112a . . . n, a current CPU utilization at server nodes 112a . . . n, current workload, bandwidth consumption tracked by server nodes 112a . . . n, a current quantity of concurrent connections at server nodes 112a . . . n, or any combination thereof.

The node throttling limits 108 may be managed and tracked by throttling manager 106 of load balancer 102, according to some other embodiments. For example, throttling manager 106 may track a quantity of service requests at each server node 112a . . . n of the plurality of server nodes 112 with respect to respective node throttling limits for each server node 112a . . . n. In some embodiments, throttling manager 106 tabulates the respective quantities of service requests sent to the plurality of service nodes 110. For example, throttling manager 106 may store and increment counters indicating the respective quantities of service requests and store the counters to data or metadata for use by throttling manager 106. In some embodiments, load balancer 102 may determine whether a given server node 112a is at its capacity (e.g., a quantity of service requests exceeds the respective node throttling limit for the given server node 112a), and based on the determination, direct additional service requests to another server node (e.g., server node 112b) of the plurality of server nodes 112.

In some embodiments, the node throttling limits 108 may be managed by throttling manager 106 executing on or included in the load balancer 102. For example, throttling manager 106 may include workflows that track and manage node throttling limits 108 based on tracking a quantity of service requests sent to and fulfilled by server nodes 112a . . . n. In some embodiments, load balancer 102 may indicate to throttling manager 106 when a service request is sent to a server node of server nodes 112a . . . n. For example, throttling manager 106 may track a count of the quantity of service requests at server nodes 112a . . . n on a per-node basis. In some embodiments, based on a determination that node throttling limit 108 for a server node 112a is met or exceeded, throttling manager 106 or load balancer 102 may cause any excess service requests to be rejected or diverted to another server node 112b . . . n. For example, based on a determination that the server node 112a is at capacity (e.g., the node throttling limit for the server node 112a is exceeded), load balancer 302 may close a connection to server node 112a and direct further service requests to other server nodes (e.g., server nodes 112b . . . n) of the fleet of server nodes 112.

In addition to or as an alternative to node-level throttling limits, an overall service throttling limit 110 may be utilized to manage a total quantity of service requests that can be issued to the plurality of server nodes 112 by clients 150, according to some embodiments. For example, a given client 150 may be limited to issuing a certain number of service requests to perform services in a given period (e.g., a quantity of service requests per second). In some embodiments, throttling manager 106 of services 102 may track the total quantity of service requests received from clients 150. For example, throttling manager 106 may determine a quantity of service requests that clients 150 can issue to the plurality of server nodes 112 in a given time period (e.g., a number of service requests per second). In other embodiments, throttling manager 106 of load balancer 102 may track the total quantity of service requests received from clients 150. For example, throttling manager 106 may determine a quantity of service requests that clients 150 can issue to the plurality of server nodes 112 in a given time period (e.g., a number of service requests per second).

Exceeding the service throttling limit 110 may not necessarily terminate connections to service nodes 112, according to some embodiments. In some embodiments, services 102 may generate an alert or a notification indicating that the overall service throttling limit has been exceeded. For example, services 102 may send the alert or the notification to clients 150 indicating that the service throttling limit 110 has been exceeded. The alert or the notification may also include one or more prompts to alleviate the service throttling limit 110. In some embodiments, one or more actions may be taken in response to the alert. For example, a configuration for the services may indicate the one or more actions to be taken following after exceeding the service throttling limit 110. Load manager 102 may include one or more scripts or logic that manage the one or more actions to be taken responsive to which of the node throttling limits 108 or the service throttling limit 110 is exceeded.

Based on calculations or determinations that a service request would not exceed node throttling limits 108 or service throttling limit 110, the service request may be accepted. In some embodiments, acceptance of the service request may include receiving the service request, at load balancer 102, and sent to server node 112a for processing. For example, when load balancer 102 and throttling manager 106 calculate that node throttling limits 108 or service throttling limit 110 would not be exceeded by accepting the service request, throttling manager 106 may direct load balancer 102 to direct the service request to server node 112a. Alternatively, calculations or determinations that the service request would not exceed node throttling limits 108 or service throttling limit 110 may occur at server node 112a, according to some embodiments.

In some embodiments, after terminating the TCP connection to the given server node 112a, another server node 112b of server nodes 112 may be utilized to receive and fulfill other service requests. For example, based on a determination that the throttling limit for the given server node 112a has been met (e.g., the given server node 112a is at its capacity), load balancer 102 may direct additional service requests to a second server node 112b of server nodes 112. As a non-limiting, illustrative example, the node throttling limit for a first server node 112a may be set to be a quantity of service requests per second, such as 1000 service requests per second. Load balancer 102 may direct up to 1000 service requests to the first server node in one second. Upon attempting to send a 1001th or more service requests, the TCP connection from load balancer 102 to the first server node 112a may be terminated. The subsequent service requests may be directed by load balancer 102 to a second server node 112b. Alternatively, load balancer 102 may direct the service requests to the appropriate server node within the node throttling limits 108 for the respective server nodes.

In one embodiment, clients 150 may encompass any type of client configurable to submit network-based requests to provider network 100 via network 160, including requests for one or more services to be performed by the plurality of server nodes 112. For example, in one embodiment a given client 150 may include a suitable version of a web browser, or may include a plug-in module or other type of code module configured to execute as an extension to or within an execution environment provided by a web browser. Alternatively, in a different embodiment, a client 150 may encompass an application such as a database application (or user interface thereof), a media application, an office application or any other application that may make use of storage resources in data storage service(s) to store and/or access the data to implement various applications. In one embodiment, such an application may include sufficient protocol support (e.g., for a suitable version of Hypertext Transfer Protocol (HTTP)) for generating and processing network-based services requests without necessarily implementing full browser support for all types of network-based data. That is, client 150 may be an application configured to interact directly with provider network 100, in one embodiment. In one embodiment, client 150 may be configured to generate network-based services requests according to a Representational State Transfer (REST)-style network-based services architecture, a document- or message-based network-based services architecture, or another suitable network-based services architecture.

In one embodiment, a client 150 may be configured to provide access to provider network 100 to other applications in a manner that is transparent to those applications. In such an embodiment, applications may not need to be modified to make use of the storage system service model. Instead, the details of interfacing to the services 102 of the provider network 100 may be coordinated by client 150.

The clients 150 may communicate with the load balancer 102 to send requests to the plurality of server nodes 112 from within the provider network 100, in some embodiments. For example, the clients 150 may be implemented on computing nodes of a computing service offered by the provider network 100. The clients 150 may convey network-based services requests to and receive responses from provider network 100 via network 160, in one embodiment. In one embodiment, network 160 may encompass any suitable combination of networking hardware and protocols necessary to establish network-based-based communications between clients 150 and provider network 100. For example, network 160 may encompass the various telecommunications networks and service providers that collectively implement the Internet. In one embodiment, network 160 may also include private networks such as local area networks (LANs) or wide area networks (WANs) as well as public or private wireless networks. For example, both a given client 150 and provider network 100 may be respectively provisioned within enterprises having their own internal networks. In such an embodiment, network 160 may include the hardware (e.g., modems, routers, switches, load balancers, proxy servers, etc.) and software (e.g., protocol stacks, accounting software, firewall/security software, etc.) necessary to establish a networking link between given client 150 and the Internet as well as between the Internet and provider network 100. It is noted that in one embodiment, clients 150 may communicate with provider network 100 using a private network rather than the public Internet.

Figure 2:
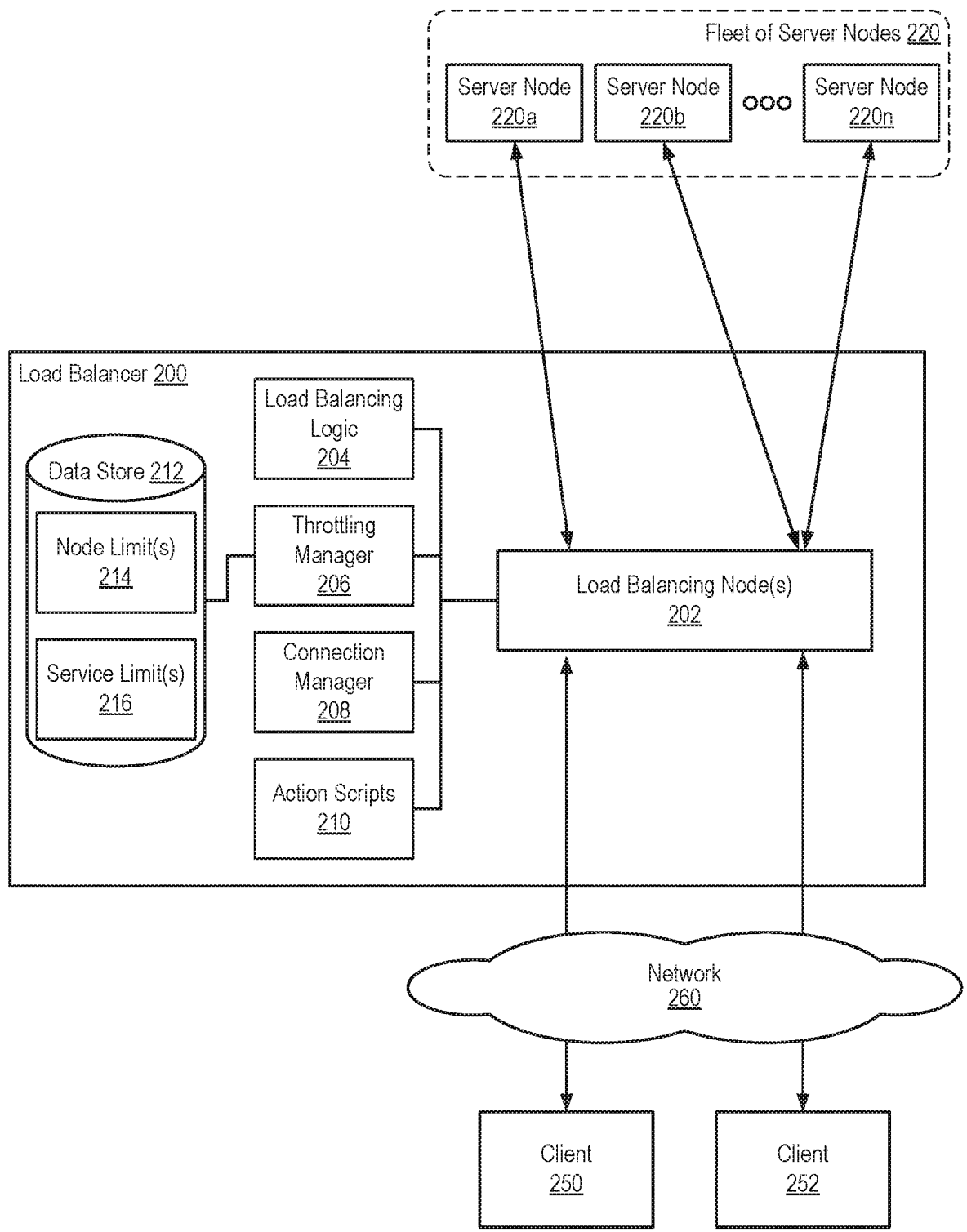
FIG. 2 is a logical block diagram illustrating a load balancer to manage throttling limits for server nodes and services, according to some embodiments.

FIG. 2 illustrates a logical block diagram of a provider network having load balancer 200 to distribute service requests from one or more clients 150 to plurality of server nodes 220, according to some embodiments. In some embodiments, load balancer 200 may be configured as a distributed load balancer. For example, load balancer 200 may include a plurality of load balancer nodes configured to perform one or more load balancing actions.

Load balancer 200 may include one or more load balancing nodes 202 and load balancing logic 204 to manage or distribute the service requests to fleet of server nodes 220, according to some embodiments. For example, load balancing nodes 202 may route traffic from an origin (e.g., clients 150) to a destination (e.g., server nodes 220). As another example, load balancer 200 may use load balancing logic 204 to determine which server node of server nodes 220 (e.g., server nodes 220a . . . n) may receive one or more service requests. In some embodiments, load balancing logic 204 may make determinations or identifications of particular server nodes 220a . . . n based on analysis performed at or by throttling manager 206. For example, throttling manager 206 may be configured to analyze current operational conditions for server nodes 220 to identify which of server nodes 220a . . . n are capable in receiving the service requests.

Throttling manager 206 may retrieve information from data store 212 to direct services requests to selected server nodes 220a . . . n, according to some embodiments. For example, throttling manager 206 may retrieve node throttling limits 214 from data store 212 indicating respective node throttling limits for server nodes 220a . . . n. In some embodiments node throttling limits 214 may indicate a respective quantity of service requests per time period which a respective server node 220a . . . n may be able to process. In some embodiments, throttling manager 206 may manage and track node throttling limits 214. For example, throttling manager 206 may track a quantity of service requests at each server node 220a . . . n of the fleet of server nodes 220 with respect to respective node throttling limits for each server node 112a . . . n. In some embodiments, throttling manager 206 tabulates the respective quantities of service requests sent to the fleet of service nodes 220. For example, throttling manager 206 may store and increment counters indicating the respective quantities of service requests and store the counters to data or metadata for use by throttling manager 206. In some embodiments, load balancer 200 may calculate whether a given server node 220a is at its capacity (e.g., a quantity of service requests exceeds the respective node throttling limit for the given server node 220a), and based on the calculation, direct additional service requests to another server node (e.g., server node 220b) of the fleet of server nodes 220.

Load balancer 200 may include connection manager 208 to drive one or more connections between client 250 or 252 and fleet of server nodes 220 to deliver service requests, according to some embodiments. In some embodiments, connection manager 208 may coordinate with load balancing nodes 202 to establish a connection between load balancer 200 and a server node 220a on behalf of client 250. For example, connection manager 208 may establish the connection on behalf of client 250 responsive to a calculation that service requests from client 250 would not cause a respective node throttling limit 214 for server node 220a to be exceeded and would not cause service throttling limit 216 to be exceeded. Additionally, connection manager 208 may establish a connection on behalf of client 252 with server node 220b via load balancing nodes 202. In some embodiments, throttling manager 206 may calculate that one or more service requests from client 252 may cause a respective node throttling limit 214 for server node 220b to be exceeded. For example, throttling manager 206 may calculate that a quantity of service requests in a given time period reaches the node throttling limit 214 for server node 220b, and subsequent service requests would exceed the node throttling limit 214. Based on the calculation by throttling manager 206 that the node throttling limit 214 for server node 220b is exceeded, connection manager 208 may close the connection established for client 252 with server node 220b and establish a new connection with server node 220n.

Throttling manager 206 may calculate whether accepting service requests from client 250 or 252 would cause service throttling limit 216 to be exceeded, according to some embodiments. For example, throttling manager 206 may calculate a cumulative quantity of service requests processed at fleet of service nodes 220 on behalf of a given client. In some embodiments, service throttling limit 216 may correspond to a quantity of service requests in a given time period. In other embodiments, service throttling limit 216 may correspond to a CPU utilization limit. In yet other embodiments, service throttling limit 216 may correspond to a workload rate or a quantity of concurrent service requests. Throttling manager 206 may take an aggregate view of server nodes 220a . . . n to calculate or determine when service throttling limit 216 may be exceeded.

Based on a calculation that service throttling limit 216 may be exceeded by additional service requests, one or more action scripts 210 may be implemented, according to some embodiments. For example, action scripts 210 may include sending an alert or notification to client 250 indicating that the service throttling limit 216 is exceeded. As another example, action scripts 210 may include sending a notification to client 250 requesting that client 250 extend or expand a corresponding SLA to accommodate for a higher service throttling limit. In some embodiments, the provider network may facilitate customized configurations for service operators to specify action scripts 210 for given services.

Figure 3:
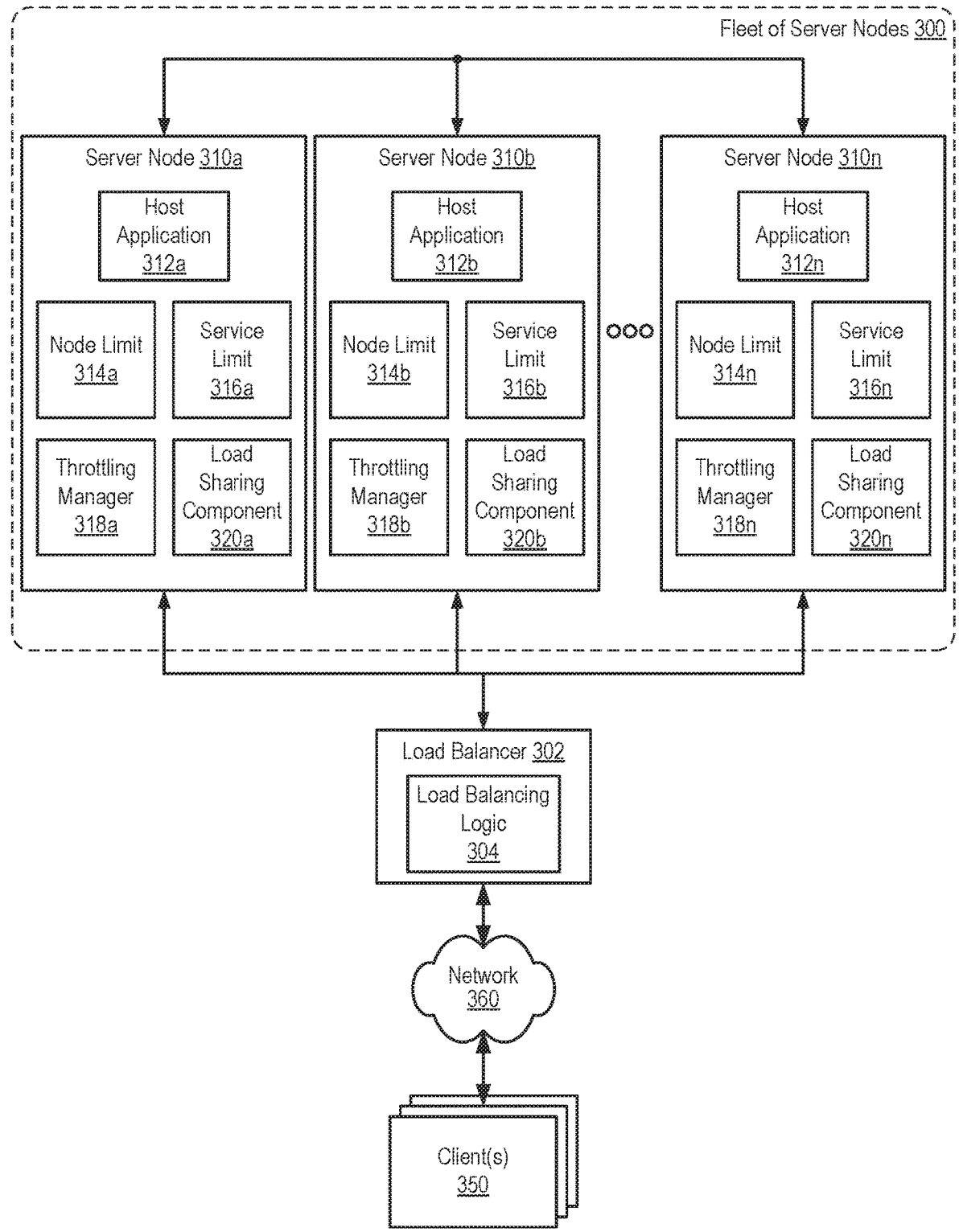
FIG. 3 is a logical block diagram illustrating a fleet of server nodes that manage throttling limits, according to some embodiments.

FIG. 3 is a block diagram illustrating a fleet of server nodes 300 that includes server nodes 310a . . . n configured to perform one or more services as part of a service provider network, according to some embodiments. The provider network may include load balancer 302 configured to distribute service requests to server nodes 310a . . . n based on load balancing logic 304, as described herein. In some embodiments, one or more clients 150 may send the service requests to the provider network via network 360, including the Internet, a local intranet or other type of connection.

The fleet of server nodes 300 may collectively perform the services in response to the service requests. In some embodiments, server nodes 310a . . . n may execute host applications 312a . . . n to fulfill the service requests. In some embodiments, host applications 312a . . . n may be parallel in nature to perform substantially similar tasks with respect to other host applications on other server nodes. In other embodiments, host applications 312a . . . n may perform different tasks with respect to the other host applications on the other server nodes.

Server nodes 310a . . . n may be subject to one or more constraints as to how many service requests may be processed at a given server node 310. In some embodiments, the constraints may include a node throttling limit that may correspond to a utilization limit for a given server node 310a . . . n. For example, the node throttling limit may correspond to a maximum quantity of service requests that may be processed by a given server node. As another example, the node throttling limit may correspond to a CPU utilization limit, a server node workload limit, a concurrent request limit, or any combination thereof.

The node throttling limit may be stored to the respective server node as data or metadata for the server node, according to some embodiments. For example, a given server node 310a may store in a storage device (e.g., a data store) a quantity of service requests that the given server node is able to handle in a given time period (e.g., a number of service requests per second), where the quantity of service requests may be referred to as the node throttling limit 314a. In some embodiments, the node throttling limit 314a may be managed by throttling manager 318a executing on the given server node 310a. For example, throttling manager 318a executing on the given server node 310a may include workflows that track and manage node throttling limit 314a based on tracking a quantity of service requests sent to and fulfilled by the given server node 310a. In some embodiments, the given server node 310a may track other node throttling limits 314b . . . n of other server nodes 310b . . . n of the fleet of server nodes 300 with respect to respective node throttling limits 314b . . . n for each server node 314b . . . n. For example, a given server node 310a may track a quantity of service requests received by server node 310b and compare the quantity of service requests to the respective node throttling limit 314b. In some embodiments, based on a determination that the node throttling limit 314a for the given server node 310a is met or exceeded, the given server node 310a may cause any excess service requests to be rejected or diverted to another server node 310b n. For example, based on a determination that the given server node 310a is at capacity (e.g., the node throttling limit 314a is exceeded), the given server node 310a may send a notification to load balancer 302 to direct further service requests to other server nodes (e.g., server nodes 310b n) of the fleet of server nodes 300.

In other embodiments, the given server node 310a may provide a rejection error (e.g., a 503 service unavailable error) to load balancer 302. For example, the load balancer 302 may receive the rejection error, which allows load balancer 302 to determine that the given server node 310a is unable to process any additional service requests. Thus, load balancer 302 may direct the additional service requests to another server node 310b . . . n of the fleet of server nodes 300. In some embodiments, each server node 310a . . . n may be configured to communicate respective node throttling limits 314a . . . n and a respective current quantity of service requests to one or more other server nodes. For example, a server node 310a may communicate its respective node throttling limit 314a and respective current quantity of service requests handled by the server node 310a to another server node 310b in order for the other server node 310b to make consensus-based decisions.

Figure 4:
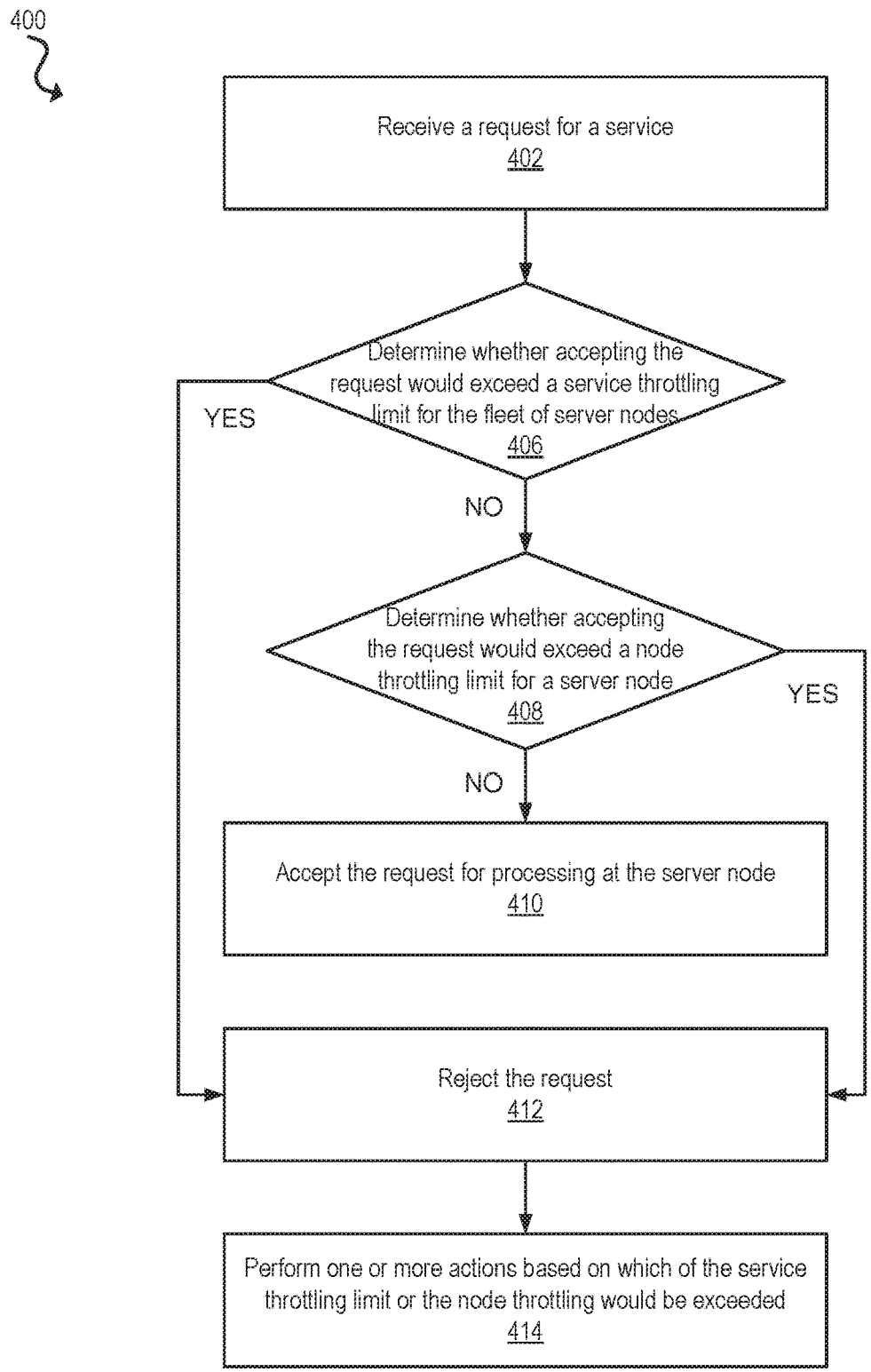
FIG. 4 is a flowchart diagram illustrating a method for distributing service requests with respect to service throttling limits and node throttling limits, according to some embodiments.

Server nodes 310a . . . n may include load sharing components 320a . . . n, according to some embodiments. In some embodiments, load sharing components 320a . . . n may establish communications between server nodes 310*a* . . . *n*. For example, load sharing component 320*a* of server node 310*a* may establish a communication channel with server node 310*b*. In some embodiments, load sharing components 320*a* . . . *n* may transmit information between server nodes 310*a* . . . *n* which may FIG. 4 is a flowchart diagram illustrating a method 400 for distributing service requests with respect to service throttling limits and node throttling limits, according to some embodiments. In some embodiments, the method 400 may be performed by a load balancer, such as load balancer 102 of FIG. 1 or load balancer 200 of FIG. 2. In other embodiments, the method 400 may be performed by server nodes 112*a* . . . *n* of FIG. 1 or server nodes 310*a* . . . *n* of FIG. 3.

The method 400 includes receiving a request for a service, at 402. In some embodiments, the request may be received from one or more other services. In other embodiments, the request may be received from one or more clients. In some embodiments, the load balancer may receive the request from one or more clients. For example, the load balancer may receive the request from clients 150 of FIG. 1, clients 250 and 252 of FIG. 2 or clients 350 of FIG. 3. In some embodiments, the clients may send requests to a provider network to cause a fleet of server nodes to perform one or more operations for the service. The provider network may correspond to provider network 100 of FIG. 1. For example, the provider network may include a service-oriented provider network to perform services on behalf of clients utilizing computing resources. In other embodiments, a server node may receive the request from the load balancer.

The method 400 also includes determining whether accepting the request would exceed a service throttling limit for a fleet of server nodes, at 404. In some embodiments, determining whether accepting the request would exceed the service throttling limit includes calculating whether accepting the request would cause a cumulative quantity of requests in a given time period for the fleet of server nodes to exceed the service throttling limit. In other embodiments, determining whether accepting the request would exceed the service throttling limit includes calculating whether accepting the request would cause a cumulative CPU utilization for the fleet of server nodes to exceed the service throttling limit. In yet other embodiments, determining whether accepting the request would exceed the service throttling limit includes calculating whether accepting the request would cause a cumulative workload for the fleet of server nodes to exceed the service throttling limit. In other embodiments, determining whether accepting the request would exceed the service throttling limit includes calculating whether accepting the request would cause a concurrent request load for the fleet of server nodes to exceed the service throttling limit.

Based on a determination that accepting the request would not exceed the service throttling limit, the method 400 may continue by determining whether accepting the request would exceed a node throttling limit for a server node of the fleet of server nodes, at 408. In some embodiments, determining whether accepting the request would exceed the node throttling limit includes calculating whether accepting the request would cause a quantity of requests in a given time period for the server node to exceed the node throttling limit. In other embodiments, determining whether accepting the request would exceed the node throttling limit includes calculating whether accepting the request would cause a CPU utilization for the server node to exceed the node throttling limit. In yet other embodiments, determining whether accepting the request would exceed the node throttling limit includes calculating whether accepting the request would cause a workload for the server node to exceed the node throttling limit. In other embodiments, determining whether accepting the request would exceed the node throttling limit includes calculating whether accepting the request would cause a concurrent request load for the server node to exceed the node throttling limit. In some embodiments, steps 406 and 408 may be performed asynchronously or sequentially irrespective of order. For example, step 408 may occur prior to step 406. As another example, steps 406 and 408 may occur at the same time.

Based on a determination that accepting the request would not exceed the node throttling limit for the server node, the method 400 continues by accepting the request for processing at the server node, at 410. In some embodiments, accepting the request may include sending, from the load balancer, the request to the server node. In other embodiments, accepting the request may include processing the request at the server node.

Based on a determination that accepting the request would exceed the service throttling limit or exceed the node throttling limit, the method 400 may continue by rejecting the request, at 412.

The method 400 further includes performing one or more actions based on which of the service throttling limit or the node throttling would be exceeded, at 414. The actions may be included in action scripts, such as action scripts 210 of FIG. 2. In some embodiments, based on a determination that the service throttling limit would be exceeded, the actions may include sending an alert indicating that the service throttling limit would be exceeded. In some embodiments, the alert may include a prompt for one or more follow-up actions. For example, the alert may request that one or more follow-up actions be performed to expand the service throttling limit, such as by expanding server resources. In some embodiments, the alert may be sent to the load balancer. In some embodiments, based on a determination that the node throttling limit would be exceeded, the actions may include closing a connection to the server node from the load balancer. For example, the connection may be established to transmit requests to the server node, and when the node throttling limit would be exceeded, the connection may be closed to prevent additional requests from being sent to the server node. In other embodiments, based on a determination that the node throttling limit would be exceeded, the actions may include requesting that the client reestablish a new connection for subsequent requests for services.

Figure 5:
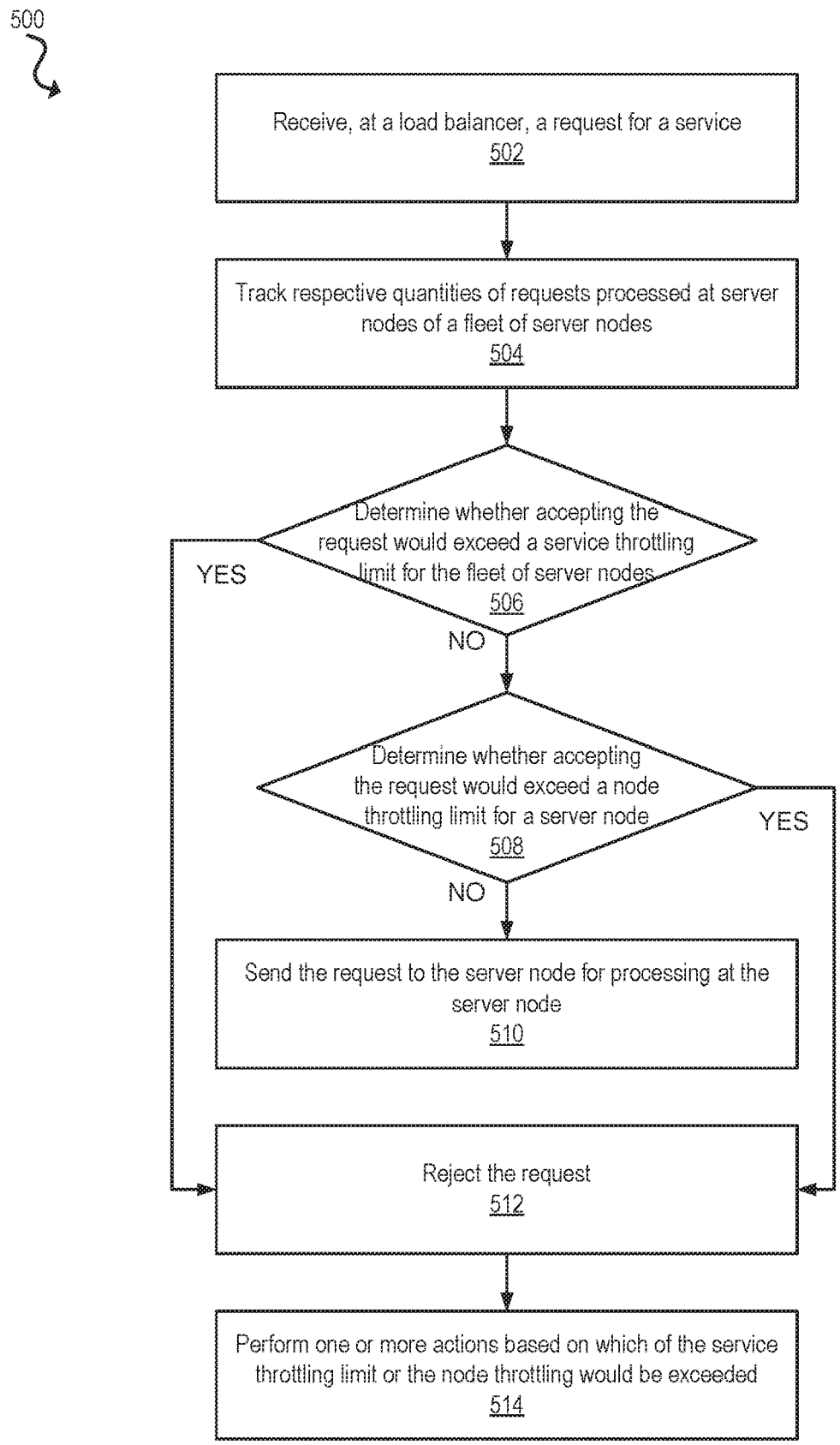
FIG. 5 is a flowchart diagram illustrating a method for distributing service requests from a load balancer with respect to service throttling limits and node throttling limits, according to some embodiments.

FIG. 5 is a flowchart diagram illustrating a method 500 for distributing service requests from a load balancer with respect to service throttling limits and node throttling limits, according to some embodiments. In some embodiments, the method 500 may be performed by a load balancer, such as load balancer 102 of FIG. 1 or load balancer 200 of FIG. 2.

The method 500 includes receiving, at the load balancer, a request for a service, at 502. In some embodiments, the request may be received from one or more other services. In some embodiments, the load balancer may receive the request from one or more clients. For example, the load balancer may receive the request from clients 150 of FIG. 1, clients 250 and 252 of FIG. 2 or clients 350 of FIG. 3. In some embodiments, the clients may send requests to a provider network to cause a fleet of server nodes to perform one or more operations for the service. The provider network may correspond to provider network 100 of FIG. 1. For example, the provider network may include a service-oriented provider network to perform services on behalf of clients utilizing computing resources.

The method 500 includes tracking respective quantities of requests processed at server nodes of a fleet of server nodes, at 504. In some embodiments, tracking the respective quantities of requests may include tabulating requests as the requests are sent to the server nodes. For example, the load balancer may increase a counter indicating respective quantities of requests when the load balancer distributes requests to respective server nodes. In some embodiments, the load balancer may store the respective quantities of requests as data or metadata to a data store, such as data store 212 of FIG. 2.

The method 500 also includes determining whether a service throttling limit for a fleet of server nodes has been exceeded, at 506. In some embodiments, determining whether accepting the request would exceed the service throttling limit includes calculating whether accepting the request would cause a cumulative quantity of requests in a given time period for the fleet of server nodes to exceed the service throttling limit. In other embodiments, determining whether accepting the request would exceed the service throttling limit includes calculating whether accepting the request would cause a cumulative CPU utilization for the fleet of server nodes to exceed the service throttling limit. In yet other embodiments, determining whether accepting the request would exceed the service throttling limit includes calculating whether accepting the request would cause a cumulative workload for the fleet of server nodes to exceed the service throttling limit. In other embodiments, determining whether accepting the request would exceed the service throttling limit includes calculating whether accepting the request would cause a concurrent request load for the fleet of server nodes to exceed the service throttling limit.

Based on a determination that accepting the request would not exceed the service throttling limit, the method 500 may continue by determining whether a node throttling limit for a server node of the fleet of server nodes has been exceeded, at 508. In some embodiments, determining whether accepting the request would exceed the node throttling limit includes calculating whether accepting the request would cause a quantity of requests in a given time period for the server node to exceed the node throttling limit. In other embodiments, determining whether accepting the request would exceed the node throttling limit includes calculating whether accepting the request would cause a CPU utilization for the server node to exceed the node throttling limit. In yet other embodiments, determining whether accepting the request would exceed the node throttling limit includes calculating whether accepting the request would cause a workload for the server node to exceed the node throttling limit. In other embodiments, determining whether accepting the request would exceed the node throttling limit includes calculating whether accepting the request would cause a concurrent request load for the server node to exceed the node throttling limit. In some embodiments, steps 506 and 508 may be performed asynchronously or sequentially irrespective of order. For example, step 508 may occur prior to step 506. As another example, steps 506 and 508 may occur at the same time.

Based on a determination that accepting the request would not exceed the node throttling limit for the server node, the method 500 continues by sending the request to the server node for processing at the server node, at 510. In some embodiments, the load balancer may send the server node via a connection established on behalf of the client.

Based on a determination that accepting the request would exceed the service throttling limit or exceed the node throttling limit, the method 500 may continue by rejecting the request, at 512.

The method 500 further includes performing one or more actions based on which of the service throttling limit or the node throttling would be exceeded, at 514. The actions may be included in action scripts, such as action scripts 210 of FIG. 2. In some embodiments, based on a determination that the service throttling limit would be exceeded, the actions may include sending an alert indicating that the service throttling limit would be exceeded. In some embodiments, the alert may include a prompt for one or more follow-up actions. For example, the alert may request that one or more follow-up actions be performed to expand the service throttling limit, such as by expanding server resources. In some embodiments, based on a determination that the node throttling limit would be exceeded, the actions may include closing a connection to the server node from the load balancer. For example, the connection may be established to transmit requests to the server node, and when the node throttling limit would be exceeded, the connection may be closed to prevent additional requests from being sent to the server node. In other embodiments, based on a determination that the node throttling limit would be exceeded, the actions may include requesting that the client reestablish a new connection for subsequent requests for services.

Figure 6:
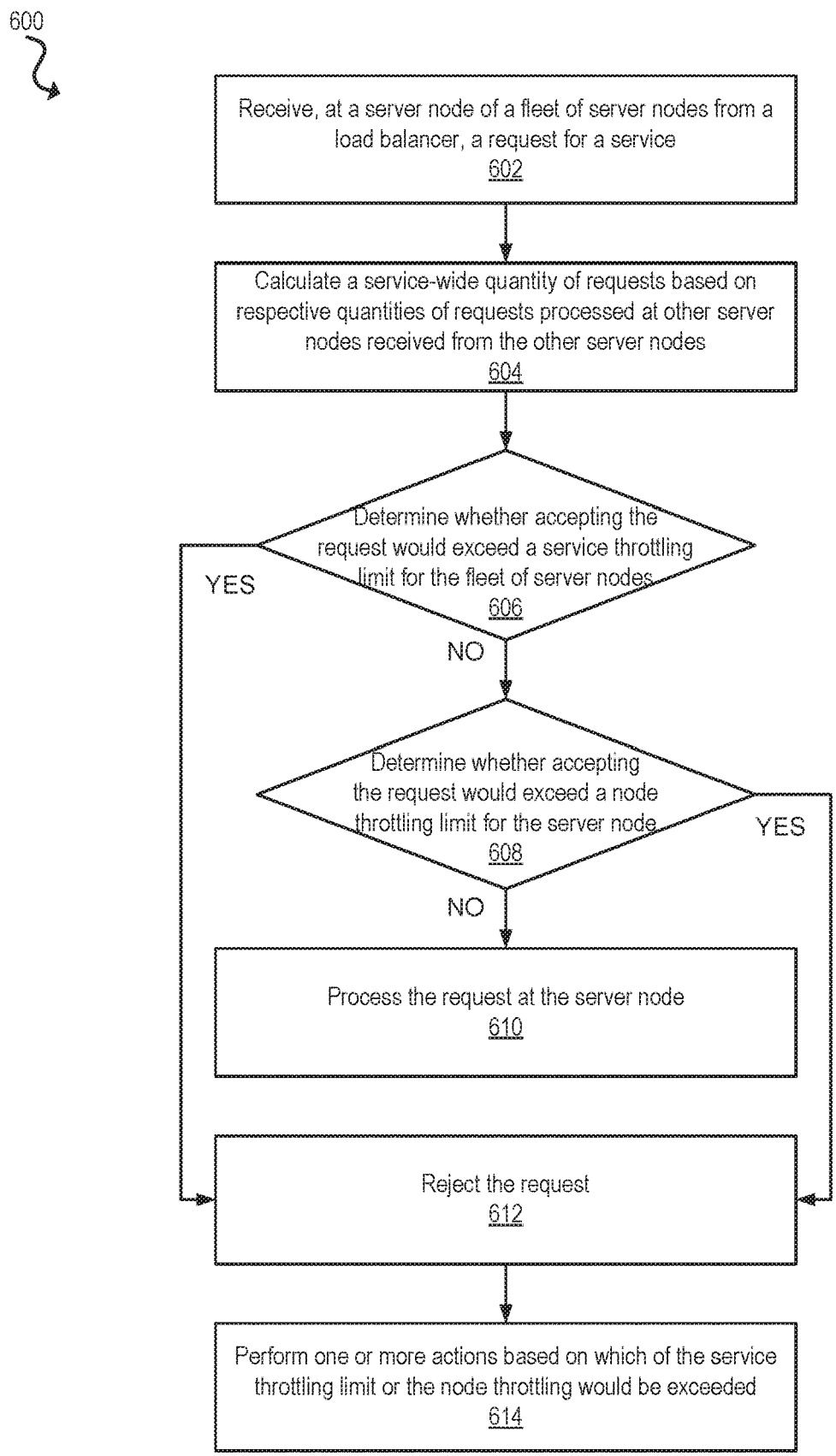
FIG. 6 is a flowchart diagram illustrating a method for managing service requests at a server node with respect to service throttling limits and node throttling limits, according to some embodiments.

FIG. 6 is a flowchart diagram illustrating a method 600 for managing service requests at a server node with respect to service throttling limits and node throttling limits, according to some embodiments. In other embodiments, the method 600 may be performed by a server node of server nodes 112a . . . n of FIG. 1 or server nodes 310a . . . n of FIG. 3.

The method 600 includes receiving, at a server node of a fleet of server nodes from a load balancer, a request for a service, at 602. In some embodiments, the request may originate from a client or another service. The client may correspond to clients 150 of FIG. 1 or clients 350 of FIG. 3. In some embodiments, the load balancer may act as an intermediary between the clients and the server node such that the client does not have a direct connection with the server node.

The method 600 also includes calculating a service-wide quantity of requests based on respective quantities of requests processed at other server nodes received from the other server nodes, at 604. In some embodiments, the server node may include a load sharing component to establish communications between the other server nodes. The load sharing component may correspond to load sharing components 320a . . . n of FIG. 3. For example, the load sharing component may send and receive information between the fleet of server nodes, such as the respective quantities of requests processed. As another example, the information may include respective CPU utilizations of the other server nodes. In some embodiments, the server node may aggregate the respective quantities of requests to calculate an overall quantity of requests for the fleet of server nodes. In some embodiments, the server node may asynchronously and continuously receive data indicating respective quantities of requests from the other server nodes. For example, the load sharing components of the other server nodes may send heartbeat data to the server node indicating the respective quantities of requests.

The method 600 also includes determining whether accepting the request would exceed a service throttling limit for a fleet of server nodes, at 606. In some embodiments, determining whether accepting the request would exceed the service throttling limit includes calculating whether accepting the request would cause a cumulative quantity of requests in a given time period for the fleet of server nodes to exceed the service throttling limit. In other embodiments, determining whether accepting the request would exceed the service throttling limit includes calculating whether accepting the request would cause a cumulative CPU utilization for the fleet of server nodes to exceed the service throttling limit. In yet other embodiments, determining whether accepting the request would exceed the service throttling limit includes calculating whether accepting the request would cause a cumulative workload for the fleet of server nodes to exceed the service throttling limit. In other embodiments, determining whether accepting the request would exceed the service throttling limit includes calculating whether accepting the request would cause a concurrent request load for the fleet of server nodes to exceed the service throttling limit.

Based on a determination that accepting the request would not exceed the service throttling limit, the method 600 may continue by determining whether accepting the request would exceed a node throttling limit for the server node, at 608. In some embodiments, determining whether accepting the request would exceed the node throttling limit includes calculating whether accepting the request would cause a quantity of requests in a given time period for the server node to exceed the node throttling limit. In other embodiments, determining whether accepting the request would exceed the node throttling limit includes calculating whether accepting the request would cause a CPU utilization for the server node to exceed the node throttling limit. In yet other embodiments, determining whether accepting the request would exceed the node throttling limit includes calculating whether accepting the request would cause a workload for the server node to exceed the node throttling limit. In other embodiments, determining whether accepting the request would exceed the node throttling limit includes calculating whether accepting the request would cause a concurrent request load for the server node to exceed the node throttling limit.

Based on a determination that accepting the request would not exceed the node throttling limit for the server node, the method 600 continues by processing the request at the server node, at 610. In some embodiments, the server node may include one or more host applications to be executed in response to the request. For example, the host applications may include host applications 312*a* . . . *n* of FIG. 3.

Based on a determination that accepting the request would exceed the service throttling limit or the node throttling limit for the server node, the method 600 continues by rejecting the request, at 612. In some embodiments, the server node may reject the request by issuing an error message to the load balancer. For example, the server node may send an alert indicating the error message to the load balancer.

The method 600 further includes performing one or more actions based on which of the service throttling limit or the node throttling would be exceeded, at 614. The actions may be included in action scripts, such as action scripts 210 of FIG. 2. In some embodiments, based on a determination that the service throttling limit would be exceeded, the actions may include sending an alert indicating that the service throttling limit would be exceeded. In some embodiments, the alert may include a prompt for one or more follow-up actions. For example, the alert may request that one or more follow-up actions be performed to expand the service throttling limit, such as by expanding server resources. In some embodiments, the alert may be sent to the load balancer. In some embodiments, based on a determination that the node throttling limit would be exceeded, the actions may include closing a connection to the server node from the load balancer. For example, the connection may be established to transmit requests to the server node, and when the node throttling limit would be exceeded, the connection may be closed to prevent additional requests from being sent to the server node. In other embodiments, based on a determination that the node throttling limit would be exceeded, the actions may include requesting that the client reestablish a new connection for subsequent requests for services.

Figure 7:
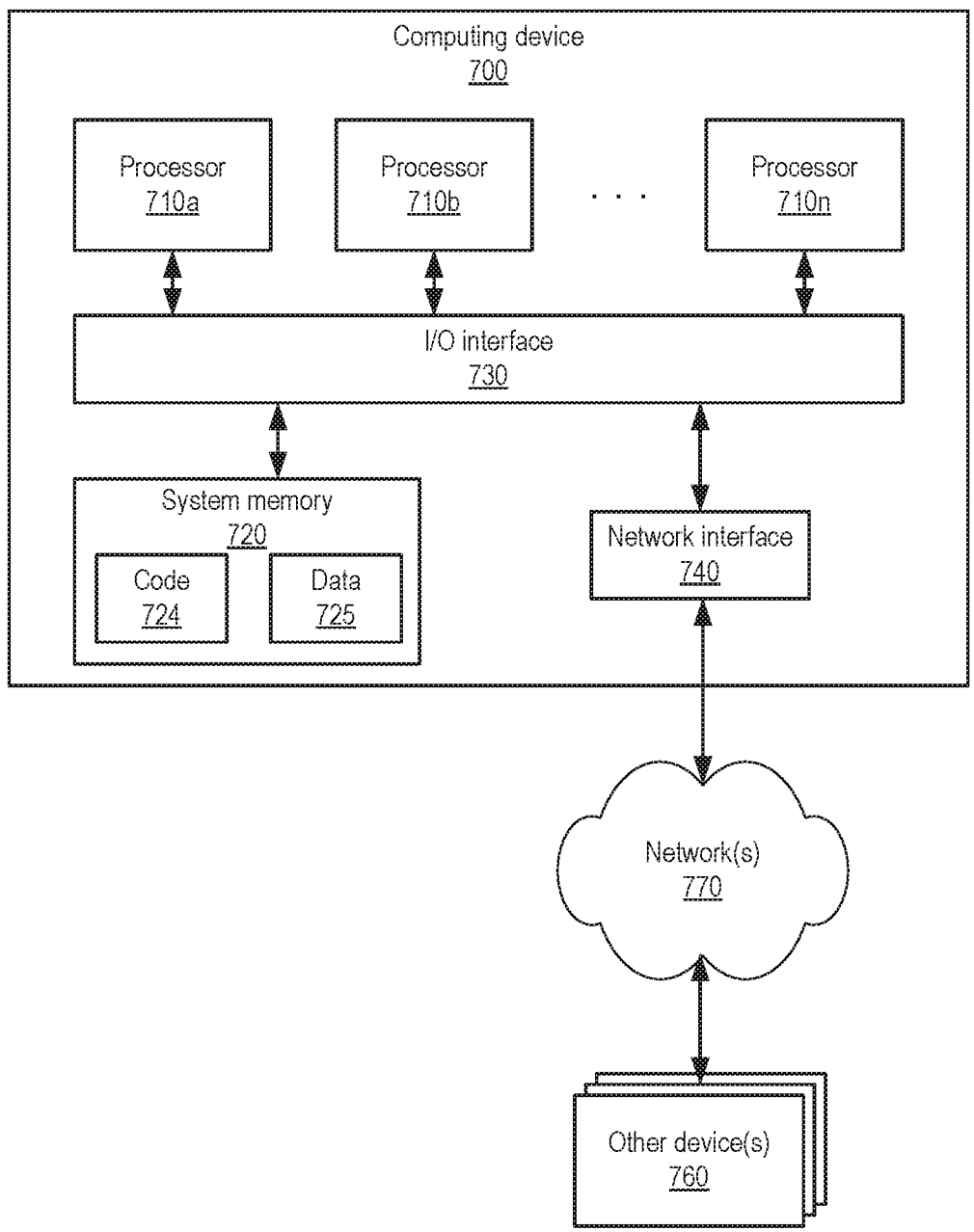
FIG. 7 is a block diagram illustrating an example computer system that may be used in some embodiments.

Any of various computer systems may be configured to implement techniques for tracking a count of a quantity of items in a data store, as disclosed herein. For example, FIG. 7 is a block diagram illustrating one embodiment of a computer system suitable for implementing some or all of the techniques and systems described herein. For example, each of the computer systems may host one or more respective containers. In some cases, a host computer system may host multiple containers. In various embodiments, the provider network may include one or more computer systems 700 such as that illustrated in FIG. 7 or one or more components of the computer system 700 that function in a same or similar way as described for the computer system 700.

In the illustrated embodiment, computer system 700 includes one or more processors 710 coupled to a system memory 720 via an input/output (I/O) interface 730. Computer system 700 further includes a network interface 740 coupled to I/O interface 730. In some embodiments, computer system 700 may be illustrative of servers implementing enterprise logic or downloadable application, while in other embodiments servers may include more, fewer, or different elements than computer system 700.

In various embodiments, computer system 700 may be a uniprocessor system including one processor 710, or a multiprocessor system including several processors 710 (e.g., two, four, eight, or another suitable number). Processors 710 may be any suitable processors capable of executing instructions. For example, in various embodiments, processors 710 may be embedded processors implementing any of a variety of instruction set architectures (ISAs), such as the x106, PowerPC, SPARC, or MIPS ISAs, or any other suitable ISA. In multiprocessor systems, each of processors 710 may commonly, but not necessarily, implement the same ISA.

System memory 720 may be configured to store instructions and data accessible by processor 710. In various embodiments, system memory 720 may be implemented using any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above for the tracking of a count of a quantity of items in a data store are shown stored within system memory 720 as program instructions 724. In some embodiments, system memory 720 may include data 725 which may be configured as described herein.

In one embodiment, I/O interface 730 may be configured to coordinate I/O traffic between processor 710, system memory 720 and any peripheral devices in the system, including through network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments, some or all of the functionality of I/O interface 730, such as an interface to system memory 720, may be incorporated directly into processor 710.

Network interface 740 may be configured to allow data to be exchanged between computer system 700 and other devices attached to a network, such as between client devices (e.g., 760, clients 150, etc.) and other computer systems, or among hosts, for example. In particular, network interface 740 may be configured to allow communication between computer system 700 and/or various other device 760 (e.g., I/O devices). Other devices 760 may include scanning devices, display devices, input devices and/or other communication devices, as described herein. Network interface 740 may commonly support one or more wireless networking protocols (e.g., Wi-Fi/IEEE 802.11, or another wireless networking standard). However, in various embodiments, network interface 740 may support communication via any suitable wired or wireless general data networks, such as other types of Ethernet networks, for example. Additionally, network interface 740 may support communication via telecommunications/telephony networks such as analog voice networks or digital fiber communications networks, via storage area networks such as Fibre Channel SANs, or via any other suitable type of network and/or protocol.

In some embodiments, system memory 720 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 700 via I/O interface 730. A computer-readable storage medium may also include any volatile or non-volatile media such as RAM (e.g. SDRAM, DDR SDRAM, RDRAM, SRAM, etc.), ROM, etc., that may be included in some embodiments of computer system 700 as system memory 720 or another type of memory. Further, a computer-accessible medium may include transmission media or signals such as electrical, electromagnetic, or digital signals, conveyed via a communication medium such as a network and/or a wireless link, which may be implemented via network interface 740.

In some embodiments, I/O devices may be relatively simple or "thin" client devices. For example, I/O devices may be configured as dumb terminals with display, data entry and communications capabilities, but otherwise little computational functionality. However, in some embodiments, I/O devices may be computer systems configured similarly to computer system 700, including one or more processors 710 and various other devices (though in some embodiments, a computer system 700 implementing an I/O device 750 may have somewhat different devices, or different classes of devices).

In various embodiments, I/O devices (e.g., scanners or display devices and other communication devices) may include, but are not limited to, one or more of: handheld devices, devices worn by or attached to a person, and devices integrated into or mounted on any mobile or fixed equipment, according to various embodiments. I/O devices may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 700. In general, an I/O device (e.g., cursor control device, keyboard, or display(s) may be any device that can communicate with elements of computing system 700.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the data transfer tool, various services, databases, devices and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:
1. A system, comprising:
a plurality of server nodes to perform a service;
one or more processors; and
a memory storing instructions that, when executed by the one or more processors, cause the one or more processors to:
receive a request for the service;
calculate whether accepting the request would exceed a service throttling limit for the plurality of server nodes for the service and whether accepting the request would exceed a node throttling limit for a server node of the plurality of server nodes; and
accept the request for processing at the server node responsive to calculating that the service throttling limit and the node throttling limit would not be exceeded.

2. The system of claim 1, wherein the instructions further cause the one or more processors to:
receive an additional request for the service;
calculate whether accepting the additional request would exceed the service throttling limit; and
responsive to calculating that accepting the additional request would exceed the service throttling limit, reject the additional request.

3. The system of claim 1, wherein the instructions further cause the one or more processors to:
receive an additional request for the service; and
calculate whether accepting the request would exceed the node throttling limit;
responsive to calculating that accepting the additional request would exceed the node throttling limit:
reject the additional request; and
close a connection to the server node; and
establish a new connection to another server node responsive to receiving a third request for the service.

4. The system of claim 1, further comprising a load balancer, wherein the load balancer comprises the one or more processors and the memory, and wherein the instructions further cause the one or more processors to:
send, from the load balancer, the request to the server node responsive to acceptance of the request for processing at the server node.

5. The system of claim 1, wherein the server node comprises the one or more processors and the memory, and wherein the instructions further cause the one or more processors to:
execute a host application to process the request responsive to acceptance of the request; and
send, to a client, one or more results from execution of the host application.

6. A method, comprising:
receiving a request for a service;
calculating whether accepting the request would exceed a service throttling limit for a plurality of server nodes for the service and whether accepting the request would exceed a node throttling limit for a server node of the plurality of server nodes; and
accepting the request for processing at the server node responsive to calculating that the service throttling limit and the node throttling limit would not be exceeded.

7. The method of claim 6, further comprising:
receiving an additional request for the service; and
calculating whether accepting the additional request would exceed the service throttling limit; and
calculating whether accepting the additional request would exceed the node throttling limit.

8. The method of claim 7, further comprising:
responsive to calculating that accepting the additional request would exceed the service throttling limit or the node throttling limit, rejecting the request.

9. The method of claim 8, further comprising:
identifying which of the service throttling limit or the node throttling limit would be exceeded; and
performing one or more actions based on the identified throttling limit that would be exceeded, wherein the one or more actions are selected from one or more scripts included in a configuration of the service.

10. The method of claim 6, further comprising:
sending, from a load balancer to the server node, the request responsive to accepting the request for processing.

11. The method of claim 6, wherein accepting the request for processing comprises:
executing a host application at the server node to process the request; and
sending, to a client, one or more results of execution of the host application.

12. The method of claim 6, further comprising:
generating a health status record of the server node, wherein accepting the request for processing at the server node is further responsive to the health status record of the server node.

13. The method of claim 6, wherein the node throttling limit corresponds to a quantity of requests the server node processes in a given time period, a central processing unit (CPU) utilization, bandwidth consumption metric for the server node, a number of concurrent connections to the server node, or any combination thereof.

14. A non-transitory, computer-readable storage medium storing instructions that, when executed by one or more processors, cause the one or more processors to:
receive a request for a service;
calculate whether accepting the request would exceed a service throttling limit for a plurality of server nodes for the service and whether accepting the request would exceed a node throttling limit for a server node of the plurality of server nodes; and
accept the request for processing at the server node responsive to calculating that the service throttling limit and the node throttling limit would not be exceeded.

15. The non-transitory, computer-readable storage medium of claim 14, wherein the instructions further cause the one or more processors to:
receive an additional request for the service;
calculate whether accepting the additional request would exceed the service throttling limit; and
calculate whether accepting the request would exceed the node throttling limit.

16. The non-transitory, computer-readable storage medium of claim 15, wherein the instructions further cause the one or more processors to:
responsive to calculating that accepting the additional request would exceed the service throttling limit or the node throttling limit, reject the request.

17. The non-transitory, computer-readable storage medium of claim 15, wherein the instructions further cause the one or more processors to:
responsive to calculating that accepting the additional request would exceed the node throttling limit, close a connection to the server node for subsequent requests.

18. The non-transitory, computer-readable storage medium of claim 17, wherein the instructions further cause the one or more processors to:
receive a third request for the service; and
establish a new connection to another server node responsive to the third request.

19. The non-transitory, computer-readable storage medium of claim 15, wherein the instructions further cause the one or more processors to:
responsive to calculating that accepting the additional request would exceed the service throttling limit or the node throttling limit, identify which of the service throttling limit or the node throttling limit would be exceeded; and
perform one or more actions based on the identified throttling limit that would be exceeded, wherein the one or more actions are selected from one or more scripts included in a configuration of the service.

20. The non-transitory, computer-readable storage medium of claim 14, wherein to calculate whether accepting the request would exceed the service throttling limit, the instructions further cause the one or more processors to:
  track a quantity of requests processed at the plurality of server nodes in a given time period; and
  compare the quantity of requests with the service throttling limit, wherein accepting the request would not exceed the service throttling limit based on a determination that the quantity of requests is fewer than the service throttling limit.

* * * * *